United States Patent
Cai et al.

(10) Patent No.: US 9,414,338 B2
(45) Date of Patent: Aug. 9, 2016

(54) NOTIFICATION OF RELAY CAPABILITIES FOR UE-TO-NETWORK RELAY FUNCTIONS

(71) Applicant: Alcatel-Lucent USA Inc., Murray Hill, NJ (US)

(72) Inventors: Yigang Cai, Naperville, IL (US); Anil Rao, Redmond, WA (US)

(73) Assignee: Alcatel Lucent, Boulogne-Billancourt (FR)

( * ) Notice: Subject to any disclaimer, the term of this patent is extended or adjusted under 35 U.S.C. 154(b) by 36 days.

(21) Appl. No.: 14/454,372

(22) Filed: Aug. 7, 2014

(65) Prior Publication Data

US 2016/0044613 A1 Feb. 11, 2016

(51) Int. Cl.
*H04B 7/212* (2006.01)
*H04W 56/00* (2009.01)
*H04W 76/02* (2009.01)
*H04W 88/04* (2009.01)
*H04W 92/10* (2009.01)
*H04W 88/08* (2009.01)

(52) U.S. Cl.
CPC ............ *H04W 56/00* (2013.01); *H04W 76/023* (2013.01); *H04W 88/04* (2013.01); *H04W 88/08* (2013.01); *H04W 92/10* (2013.01)

(58) Field of Classification Search
CPC ......... H04L 2012/5608; H04W 84/12; H04W 88/08; H04W 80/04; H04W 8/26; H04W 88/06; H04W 88/18
USPC .............. 370/400, 349, 310.2, 328, 338, 332, 370/350
See application file for complete search history.

(56) References Cited

U.S. PATENT DOCUMENTS

| 7,218,891 B2 * | 5/2007 | Periyalwar | H04W 52/46 455/11.1 |
| 8,537,744 B2 * | 9/2013 | Chou | H04L 45/20 370/328 |
| 2006/0002366 A1 * | 1/2006 | Kawaguchi | H04L 45/00 370/349 |
| 2011/0286381 A1 * | 11/2011 | Ye | H04B 7/155 370/315 |
| 2015/0038136 A1 * | 2/2015 | Wu | H04W 88/04 455/434 |
| 2015/0296469 A1 * | 10/2015 | Yoon | H04W 76/023 370/350 |

OTHER PUBLICATIONS

3rd Generation Partnership Project, Study on LTE Device to Device Proximity Services, 3GPP TR 36.843, Version 12.0.1 (Mar. 2014).
3rd Generation Partnership Project, Proximity-based Services, 3GPP TS 23.303, Version 12.0.0 (Feb. 2014).
3rd Generation Partnership Project, Feasibility Study for Proximity Services (ProSe), 3GPP TR 22.803, Version 12.2.0 (Jun. 2013).
3GPP TSG RAN Meeting #63, Work Item Proposal on LTE Device to Device Proximity Services, RP-140518 (Mar. 2014).
3GPP TSG RAN WG1 Meeting #77, System Control and Security for D2D Broadcast Communication, R1-142053 (May 2014).

* cited by examiner

*Primary Examiner* — Brenda H Pham
(74) *Attorney, Agent, or Firm* — Duft Bornsen & Fettig, LLP

(57) ABSTRACT

One embodiment is a relay User Equipment (UE) enabled for UE-to-network relay. The relay UE determines relay capabilities for acting as a relay to re-transmit traffic between a remote UE and a network. The relay UE generates synchronization signals for synchronizing with other relay UEs in proximity for device-to-device (D2D) communication, and inserts an indication of the relay capabilities in the synchronization signals. The relay UE transmits the synchronization signals over-the-air to the other relay UEs.

18 Claims, 7 Drawing Sheets

NOTIFICATION OF RELAY CAPABILITIES FOR UE-TO-NETWORK RELAY FUNCTIONS

FIELD OF THE INVENTION

The invention is related to the field of communication systems and, in particular, to proximity services such as UE-to-network relay.

BACKGROUND

Proximity services or proximity-based services refer to services provided between devices (i.e., User Equipment (UE)) being in proximity to each other. Proximity services utilize the radio technologies of the UEs so that the UEs in close proximity can exchange communications directly with one another without going through the core network, which is also referred to as device-to-device (D2D) communications. A UE is considered in "proximity" of another UE if they are able to establish direct communications.

The Third Generation Partnership Program (3GPP) has defined Proximity Services (ProSe) for a Long Term Evolution (LTE) network. ProSe allows for D2D communications as an underlay to the cellular network. In D2D communications, UEs transmit data signals to each other over a direct link using the cellular resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include direct discovery of UEs are that proximate to one another, direct communication between the UEs that are proximate to one another, and UE-to-network relay. UE-to-network relay is a function where a UE can relay any type of traffic from a remote UE to the network, or from the network to the remote UE. For example, if a UE (referred to as a remote UE) is outside of the coverage area of the base stations for a network, then the UE-to-network relay function allows the remote UE to transmit traffic to a relay UE that is in the coverage area of a base station through a direct communication with the relay UE. The relay UE in turn forwards the traffic from the remote UE to the network by communicating with a base station of the network.

SUMMARY

Embodiments described herein provide for synchronization of UEs for a UE-to-network relay function. Before a UE uses its radio resources to transmit data/traffic to another UE for a direct communication or UE-to-network relay, the UE performs a synchronization process to synchronize its timing, frequency, etc., with the other UE(s) for a direct communication. As part of the synchronization process, a UE determines its capabilities for acting as a relay for a UE-to-network relay function. The UE then announces its relay capabilities to other UEs in the synchronization signals used during the synchronization process. Therefore, the UE not only synchronizes its radio resources with other UEs for transmitting traffic, but also informs the other UEs of its ability to act as a relay for those other UEs.

One embodiment comprises relay User Equipment (UE) enabled for UE-to-network relay. The relay UE includes a controller configured to determine relay capabilities of the relay UE to act as a relay to re-transmit traffic between a remote UE and a network, to generate synchronization signals for synchronizing the relay UE with other relay UEs in proximity for device-to-device (D2D) communication, and to insert an indication of the relay capabilities of the relay UE in the synchronization signals. The relay UE further includes a radio interface configured to transmit the synchronization signals over-the-air to the other relay UEs.

In another embodiment, the controller is configured to insert the indication of the relay capabilities in a parameter of the synchronization signals. The indication is selected from: direct relay where the relay UE is in-coverage of a base station, indirect relay where the relay UE is out-of-coverage of a base station but has D2D communication with another relay UE that is in-coverage of a base station, and no relay where the relay UE is out-of-coverage of a base station and does not have D2D communication with another relay UE that is in-coverage of a base station.

In another embodiment, the controller is configured to determine a number of hops between the relay UE and the network over at least one of the other relay UEs, and to insert an indicator of the number of hops in the synchronization signals.

In another embodiment, the controller is configured to determine a signal strength between the relay UE and the other relay UEs in proximity, and to insert an indicator of the signal strength in the synchronization signals.

In another embodiment, the radio interface is configured to transmit the synchronization signals over a primary D2D Synchronization Channel (PD2DSC).

In another embodiment, the controller is configured to receive the synchronization signals from the other relay UEs, to process the synchronization signals to identify the relay capabilities of the other relay UEs, and to store the relay capabilities of the other relay UEs.

Another embodiment comprises a method of operating a relay UE enabled for UE-to-network relay. The method includes determining relay capabilities of the relay UE to act as a relay to re-transmit traffic between a remote UE and a network, generating synchronization signals for synchronizing the relay UE with other relay UEs in proximity for device-to-device (D2D) communication, inserting an indication of the relay capabilities of the relay UE in the synchronization signals, and transmitting the synchronization signals over-the-air to the other relay UEs.

Another embodiment comprises an originating UE enabled for UE-to-network relay. The originating UE includes a controller configured to receive synchronization signals from a plurality of relay UEs for synchronizing the originating UE with the relay UEs for D2D communication, and to process the synchronization signals to identify relay capabilities of the relay UEs to act as relays to re-transmit traffic between the originating UE and a network. The controller is configured to determine a route for traffic based on the relay capabilities of the relay UEs in proximity. The originating UE further includes a radio interface configured to transmit the traffic toward the network over the route.

In another embodiment, the controller is configured to determine the route for the traffic based on a number of hops from each of the relay UEs to the network.

In another embodiment, the controller is configured to determine the route for the traffic based on a signal strength between each of the relay UEs and the originating UE.

Another embodiment comprises a method of operating an originating UE enabled for UE-to-network relay. The method includes receiving synchronization signals in the originating UE from a plurality of relay UEs for synchronizing the originating UE with the relay UEs for a D2D communication, and processing the synchronization signals to identify relay capabilities of the relay UEs to act as relays to re-transmit traffic between the originating UE and a network. The method further includes determining a route for traffic based on the relay capabilities of the relay UEs in proximity, and transmitting the traffic toward the network over the route.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
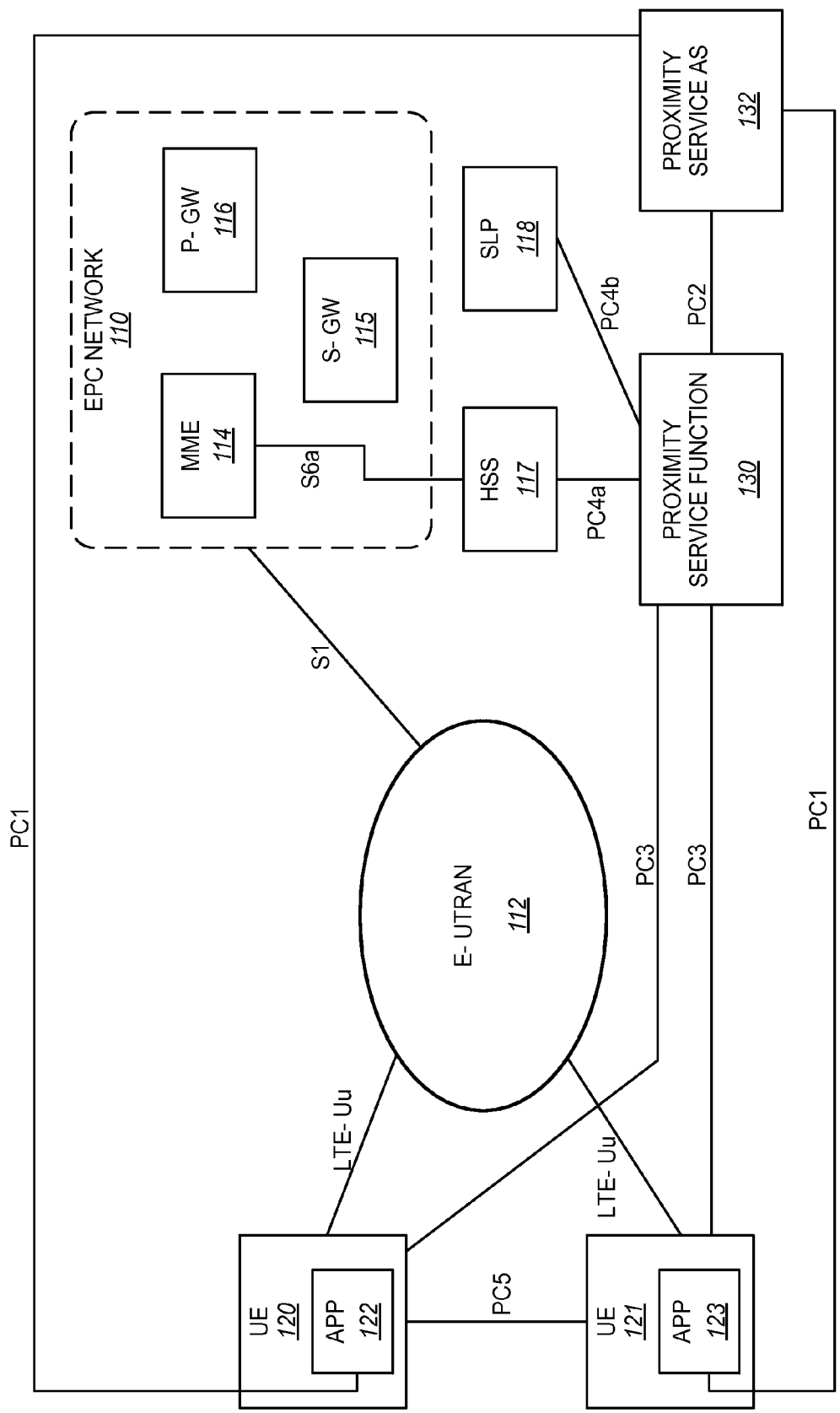
FIG. 1 illustrates a Public Land Mobile Network (PLMN) architecture for ProSe features in an LTE network.

FIG. 1 illustrates a Public Land Mobile Network (PLMN) architecture 100 for ProSe features in an LTE network. Architecture 100 is described in 3GPP TS 23.303 (v12.0.0), which is incorporated by reference as if fully included herein. Architecture 100 includes an Evolved Packet Core (EPC) network 110 that communicates with UEs 120-121 over a Radio Access Network (RAN), which is illustrated as an Evolved-UMTS Terrestrial Radio Access Network (E-UTRAN) 112. Although not shown in FIG. 1, E-UTRAN 112 includes a plurality of base stations (e.g., eNodeB) that provide wireless connections between UEs and EPC network 110. EPC network 110 includes a Mobility Management Entity 114, an S-GW 115, and a P-GW 116, but may include other elements not shown. The operation of these elements in EPC network 110 is outside of the scope of the embodiments described herein. Architecture 100 also includes a Home Subscriber Server (HSS) 117 and a Secure User Plane Location Platform (SLP) 118, which are also beyond the scope of the embodiments.

The architecture 100 in FIG. 1 illustrates a non-roaming scenario. However, there may be other architectures applicable to the embodiments described herein, such as an inter-PLMN architecture (see FIG. 4.2-2 of 3GPP TS 23.303), a roaming architecture (see FIG. 4.2-3 of 3GPP TS 23.303), an architecture when a UE is covered by a WLAN instead of an E-UTRAN, etc.

Architecture 100 further includes a Proximity Service (ProSe) function 130 and a ProSe Application Server (AS) 132. ProSe function 130 comprises any server, device, apparatus, or equipment (including hardware) that is used for network-related actions required for proximity-type services. ProSe function 130 may play different roles for each of the features of ProSe. ProSe AS 132 comprises any server, device, apparatus, or equipment (including hardware) that supports storage of EPC ProSe User IDs and ProSe Function IDs, and mapping of Application Layer User IDs and EPC ProSe User IDs.

UEs 120-121 comprise any devices used directly by an end user for communication, such as a mobile terminal, a laptop computer equipped with a mobile broadband adapter, etc. UEs 120-121 may be considered as ProSe-enabled, meaning that they support ProSe requirements and associated procedures. A ProSe-enabled UE as described herein refers to both a non-Public Safety UE and a Public Safety UE. Each UE 120-121 includes an application 122 and 123, respectively, that is used to access/provide proximity services (ProSe), such as D2D direct communication and UE-to-network relay. The applications 122-123 may comprise a local voice service, multimedia content sharing, gaming, group multicast, content-aware applications, public safety, etc.

Although 3GPP ProSe is discussed above for architecture 100, this is just one example. The concepts discussed herein are applicable to any proximity service that enables direct communication between devices. Proximity services as discussed herein include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery is referred to as EPC-level discovery, which is a process by which EPC network 110 determines the proximity of two UEs and informs them of their proximity. For example, a server in EPC network 110 may monitor the location of UEs, and inform the UEs of their proximity.

Direct communication is a communication between two or more UEs in proximity by means of user plane transmission using radio technology (e.g., E-UTRA) via a path not traversing any network node (other than possibly a base station of a RAN). Direct communication allows the UEs to use local radio resources to communicate directly with each other without routing traffic through a core network, such as EPC network 110. For example, UEs may directly communicate through the radio resources available to both UEs from a RAN, such as from a base station. UEs may also directly communicate through the radio resources of the UEs themselves, such as over the PC5 reference point. Either way, the traffic exchanged between the UEs is not routed through the core network, but is routed directly between the UEs over a wireless interface.

UE-to-network relay is a function where one UE provides functionality to support connectivity to "unicast" services for one or more remote UEs. A remote UE refers to a UE that is not served by an RAN (e.g., E-UTRAN), and communicates with a Packet Data Network (PDN) through a UE-to-network relay. For instance, if a remote UE is out-of-coverage of a RAN, then the remote UE may still access the PDN through another UE (relay UE) that is in-coverage of the RAN. A relay UE is a device that is enabled for UE-to-network relay. UE-to-network relay allows for one-to-one or one-to-many communications from the network to a remote UE via a relay UE which is in-coverage, or from a remote UE to the network via a relay UE that is in-coverage. Therefore, the term "UE-to-network relay" refers to communication from a remote UE to the network, and from the network to the remote UE. The communication between a remote UE and a relay UE, or between two relay UEs, is referred to as a direct communication or D2D communication.

Figure 2:
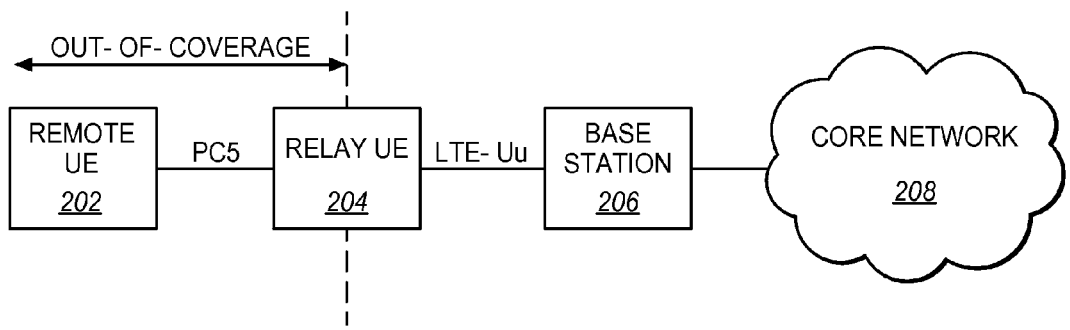
FIG. 2 illustrates a UE-to-network relay scenario in an exemplary embodiment.

The embodiments described herein apply to the UE-to-network relay function for proximity services. FIG. 2 illustrates a UE-to-network relay scenario in an exemplary embodiment. In the UE-to-network relay scenario, a remote UE 202 is out-of-coverage of a RAN but has direct communication (D2D) with a relay UE 204. In turn, relay UE 204 is in communication with a base station 206 (e.g., eNodeB) of an operator network (which also includes core network 208, such as an EPC). Relay UE 204 relays unicast traffic (UL and DL) between remote UE 202 and the network 208. Relay UE 204 provides generic functions that can relay any type of traffic. One-to-one direct communication between remote UE 202 and relay UE 204 may have the following characteristics: communication over the PC5 reference point is connectionless, and bearers are bi-directional. IP packets passed to the radio layers on a given bearer will be transmitted by the physical layer with the associated Layer-2 destination address. IP packets passed up from the radio layers on the same bearer will have been received over-the-air addressed to the same Layer-2 destination.

Although relay UE 204 is illustrated as being in communication (e.g., in the coverage area of) base station 206, relay UEs may also be outside the coverage area of any base station. Thus, there are at least three different relay capabilities defined herein for a relay UE. The relay capabilities are "direct relay", "indirect relay", and "no relay", which are described in more detail below.

Figure 3:
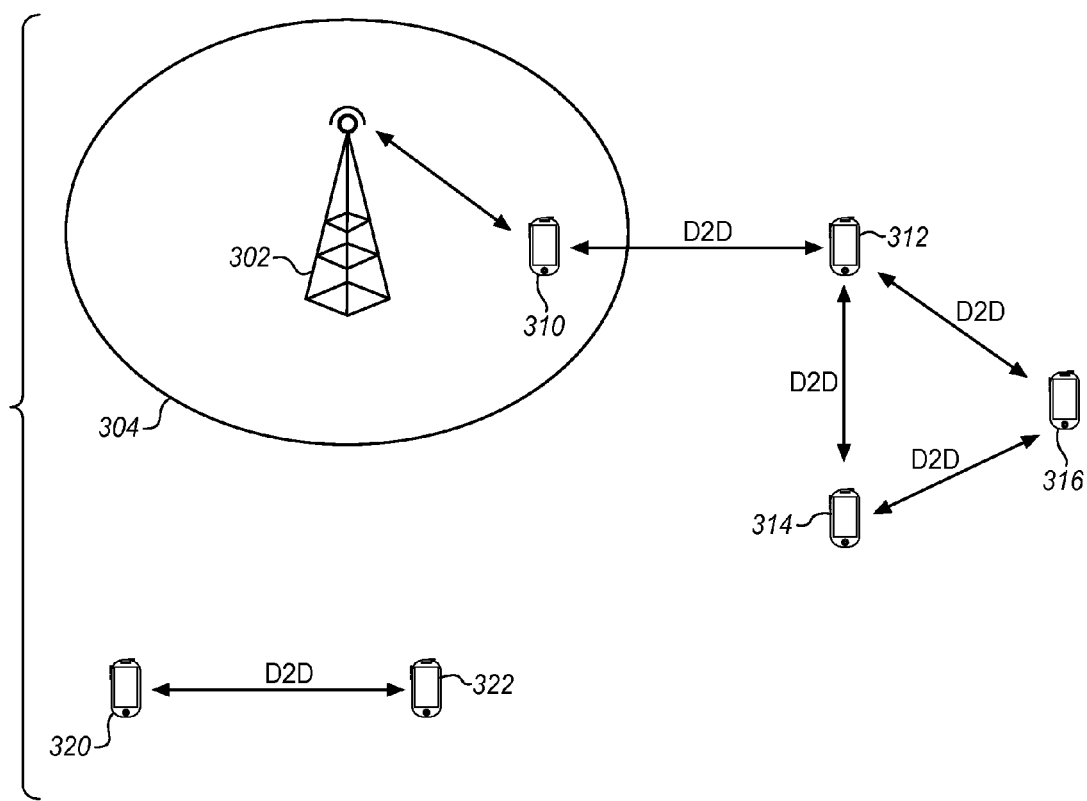
FIG. 3 illustrates different relay capabilities of a relay UE in an exemplary embodiment.

FIG. 3 illustrates different relay capabilities of a relay UE in an exemplary embodiment. FIG. 3 illustrates a base station 302 that has a coverage area 304 (or service area) representing a cell. In this embodiment, UE 310 may represent a relay UE for a UE-to-network relay function. UE 310 is within the coverage area 304 of base station 302, so UE 310 is considered in-coverage of base station 302. The relay capabilities of UE 310 may therefore be defined as "direct relay". Direct relay refers to a relay UE that is in-coverage of a base station or RAN so that it may communicate directly with the base station. Other remote UEs, such as UE 312, may communicate with the network through UE 310 acting as the relay.

UE 312 may also act as a relay UE in this embodiment. UE 312 is not within the coverage area 304 of base station 302, but UE 312 does have D2D communication capability with UE 310 that is within the coverage area 304 of base station 302. Therefore, the relay capabilities of UE 312 may be defined as "indirect relay". Indirect relay refers to a relay UE that is out-of-coverage of a base station or RAN, but has D2D communication with a relay UE that is in-coverage of a base station or RAN (possibly through one or more relay UEs). Other remote UEs, such as UE 314, may communicate with the network through UE 312 acting as a relay.

UE 314 may also act as a relay UE in this embodiment. UE 314 is not within the coverage area 304 of base station 302, but UE 314 does have D2D communication capability with UE 312 which in turn has D2D communication capability with UE 310 that is within the coverage area 304 of base station 302. Because UE 314 has D2D communication with UE 310 through UE 312, the relay capabilities of UE 314 may also be defined as "indirect relay". Other remote UEs, such as UE 316, may communicate with the network through UE 314 acting as a relay. UE 316 has similar indirect relay capabilities.

UE 320 and UE 322 are each outside of the coverage area 304 of base station 302. Also, neither of UE 320 and UE 322 has direct communication capability with another UE 310 that has relay capabilities. Therefore, the relay capabilities of UE 320 and 322 may be defined as "no relay". No relay refers to a UE that is out-of-coverage of a base station or RAN, and does not have D2D communication with a relay UE that is in-coverage of a base station or RAN.

Figure 4:
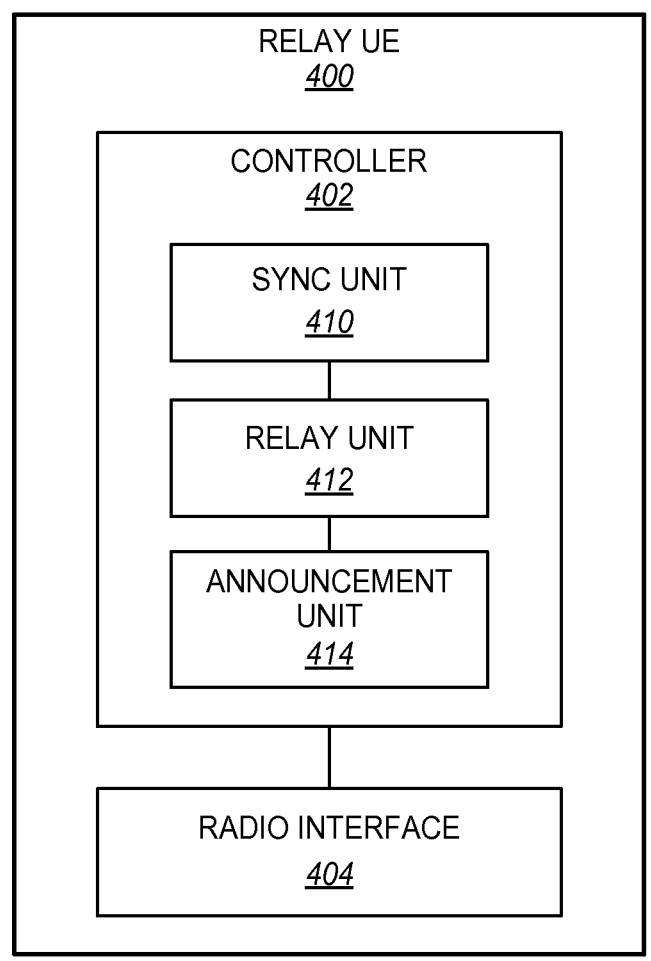
FIG. 4 illustrates a relay UE in an exemplary embodiment.

In the embodiments described herein, relay UEs are enhanced to announce their relay capabilities during a synchronization process for the UE-to-network relay function. FIG. 4 illustrates a relay UE 400 in an exemplary embodiment. Relay UE 400 may represent any UE that is enabled for proximity services that include UE-to-network relay functions. Relay UE 400 includes a controller 402 (including a processor) and a radio interface 404. Controller 402 provides a synchronization (sync) unit 410, a relay unit 412, and an announcement unit 414. Sync unit 410 comprises an apparatus, a server, a device, or equipment (including hardware) configured to control a synchronization process. The synchronization process prepares a UE for a D2D communication (i.e., for direct communication or for UE-to-network relay). Relay unit 412 comprises an apparatus, a device, or equipment (including hardware) configured to determine the capability of a UE to act as a relay for a UE-to-network relay function. Announcement unit 414 comprises an apparatus, a device, or equipment (including hardware) configured to provide an indication of the capability of a UE to act as a relay for a UE-to-network relay function during a synchronization process. Radio interface 404 represents the local radio resources of relay UE 400 used for wireless communications, such as a transceiver and an antenna.

Figure 5:
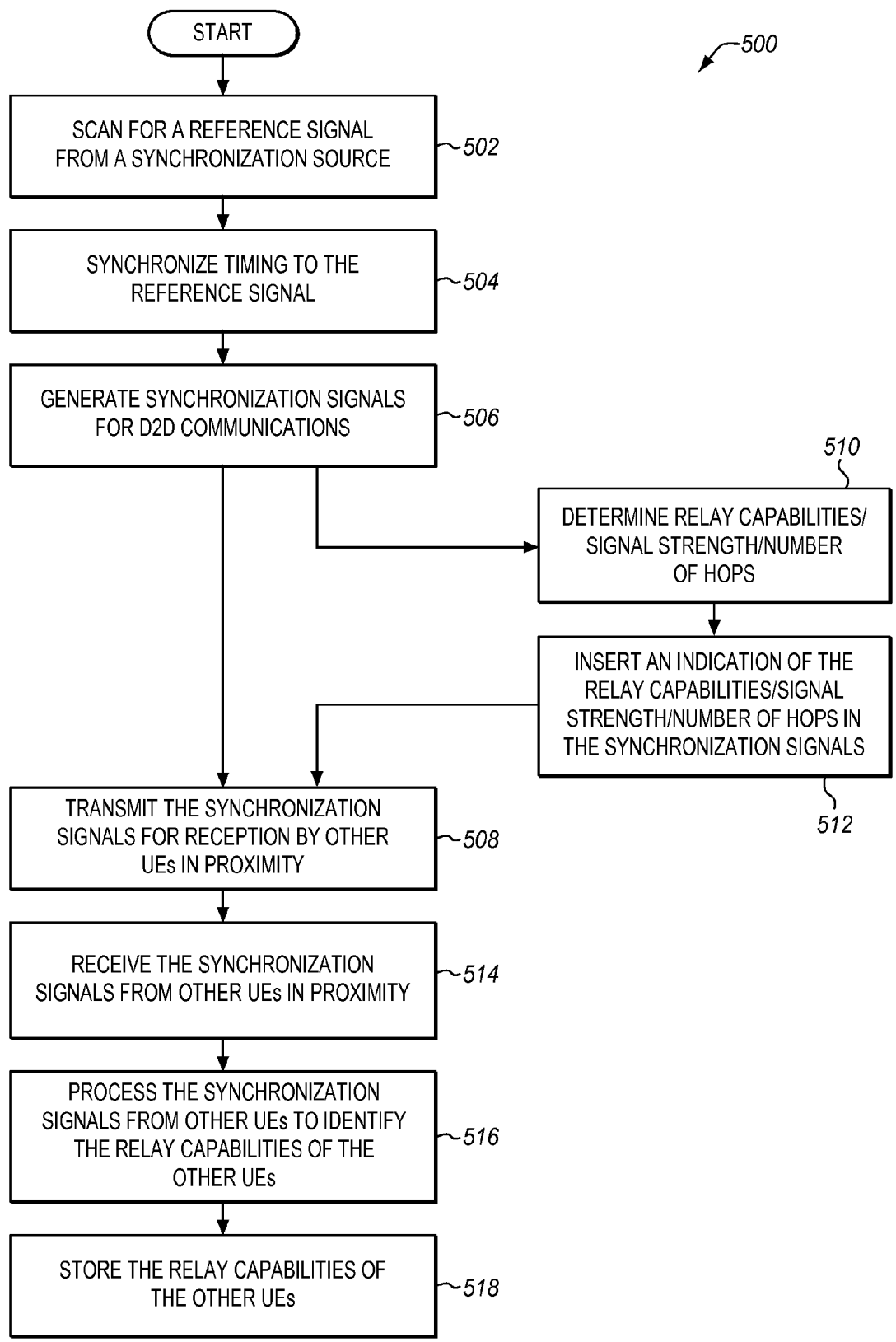
FIG. 5 is a flow chart illustrating a method for relay notification during a synchronization process in an exemplary embodiment.

FIG. 5 is a flow chart illustrating method 500 for relay notification during a synchronization process in an exemplary embodiment. The steps of method 500 will be described with reference to relay UE 400 in FIG. 4, but those skilled in the art will appreciate that method 500 may be performed in other systems. Also, the steps of the flow charts described herein are not all inclusive and may include other steps not shown, and the steps may be performed in an alternative order.

The method described in FIG. 5 is for proximity services that include discovery, direct communication (D2D), and UE-to-network relay (that uses D2D). One assumption for method 500 is that discovery has already taken place so that relay UE 400 has detected other UEs in its proximity. After discovery, relay UE 400 may enter into a synchronization process. As part of the synchronization process, each UE prepares for D2D communication by acquiring synchronization using a reference or synchronization signal. Relay UE 400 may then use the reference signal to determine timing for D2D communications (for UE-to-network relay in this embodiment).

For the synchronization process, relay UE 400 scans for a reference signal from a synchronization source (step 502). The reference signal may be a Primary D2D Synchronization Signal (PD2DSS) or Secondary D2D Synchronization Signal (SD2DSS) from a base station (e.g., eNodeB). The reference signal may also be from another UE that acts as the synchronization source instead of a base station.

When a reference signal is detected, relay UE 400 synchronizes its timing to the reference signal (step 504). In other words, controller 402 of relay UE 400 may synchronize the timing used by radio interface 404 for communications based on the reference signal.

Sync unit 410 generates synchronization signals for D2D communications (step 506). The synchronization signals may be referred to as D2D Synchronization Signals (D2DSS). Radio interface 404 transmits the synchronization signals over-the-air for reception by other UEs in proximity to relay UE 400 (step 508). Sync unit 410 may continue to exchange synchronization signals with the other UEs through radio interface 404 to allow the UEs to coordinate with one another for D2D communications.

During the synchronization process, relay unit 412 determines the relay capabilities of relay UE 400 (step 510). The relay capabilities indicate the capacity of a UE to act as a relay to re-transmit traffic between a remote UE and the network. In this embodiment, relay unit 412 may select between three different capabilities for relay UE 400, which are "direct relay", "indirect relay", and "no relay". Announcement unit 414 inserts an indication of the relay capabilities in the synchronization signals (step 512). To insert the indication of the relay capabilities in the synchronization signals, a new parameter may be defined in the synchronization signals for the relay capability indication. The parameter may have a value that indicates "direct relay", "indirect relay", or "no relay".

Radio interface 404 transmits the synchronization signals with the relay capabilities of relay UE 400 (see step 508).

As an example, if relay UE 400 is in-coverage of a base station (i.e., in the state of RRC_CONNECTED or RRC_IDLE), then relay unit 412 determines the relay capabilities of UE 400 as "direct relay". Announcement unit 414 may insert an indicator in the synchronization signals that relay UE 400 has "direct relay" capabilities.

In another example, if relay UE 400 is out-of-coverage of a base station but can synchronize or has D2D communication with another relay UE that is in-coverage of a base station, then relay unit 412 determines the relay capabilities of UE 400 as "indirect relay". Announcement unit 414 may insert an indicator in the synchronization signals that relay UE 400 has "indirect relay" capabilities.

In another example, if relay UE 400 is out-of-coverage of a base station and does not have D2D communication with a UE that is in-coverage of a base station, then relay unit 412 determines the relay capabilities of UE 400 as "no relay". Announcement unit 414 may insert an indicator in the synchronization signals that relay UE 400 has "no relay" capabilities.

Relay unit 412 may also determine the signal strength (i.e., stratum level) between relay UE 400 and another relay UE (see step 510). In FIG. 3 for example, a relay unit in UE 310 may determine the signal strength with UE 312. A relay unit in UE 312 may determine the signal strength with UE 310, UE 314, and UE 316. A relay unit in UE 314 may determine the signal strength with UE 312 and UE 316. Announcement unit 414 may insert an indicator in the synchronization signals of the signal strength (see step 512). The indicator may be inserted in a newly defined parameter in the synchronization signals.

Relay unit 412 may also determine the number of hops or degree of separation between relay UE 400 and the network (see step 510). A hop or degree of separation may indicate the number of D2D links that are established between relay UE 400 and another relay UE that is in-coverage of a base station. In FIG. 3 for example, UE 310 is in-coverage of base station 302. UE 312 is out-of-coverage, but has D2D communication with UE 310 that is in-coverage. Therefore, UE 312 as a relay would have 1 hop (e.g., one D2D link) to UE 310. UE 314 is out-of-coverage, but has D2D communication with UE 312 which has D2D communication with UE 310 through UE 312. Announcement unit 414 may insert an indicator in the synchronization signals of the number of hops for relay UE 400 (see step 512). The indicator may be inserted in a newly defined parameter in the synchronization signals.

Relay UE 400 may continue to exchange synchronization signals with other UEs in preparation for D2D communication for UE-to-network relay. The other UEs also operate as described in method 500 to announce their relay capabilities. Therefore, relay unit 412 of relay UE 400 receives the synchronization signals from the other UEs (step 514) through radio interface 404. Relay unit 412 processes the synchronization signals from the other UEs to identify the relay capabilities of the other UEs (step 516). Relay unit 412 may also process the synchronization signals from the other UEs to identify the number of hops and signal strength. Relay unit 412 then stores the relay capabilities of the other UEs (step 518), such as in a local memory. As the relay UEs are mobile, the relay capabilities of the relay UEs may change over time. Thus, relay unit 412 may update the relay capabilities as it continues to exchange synchronization signals with other UEs in proximity.

Figure 6:
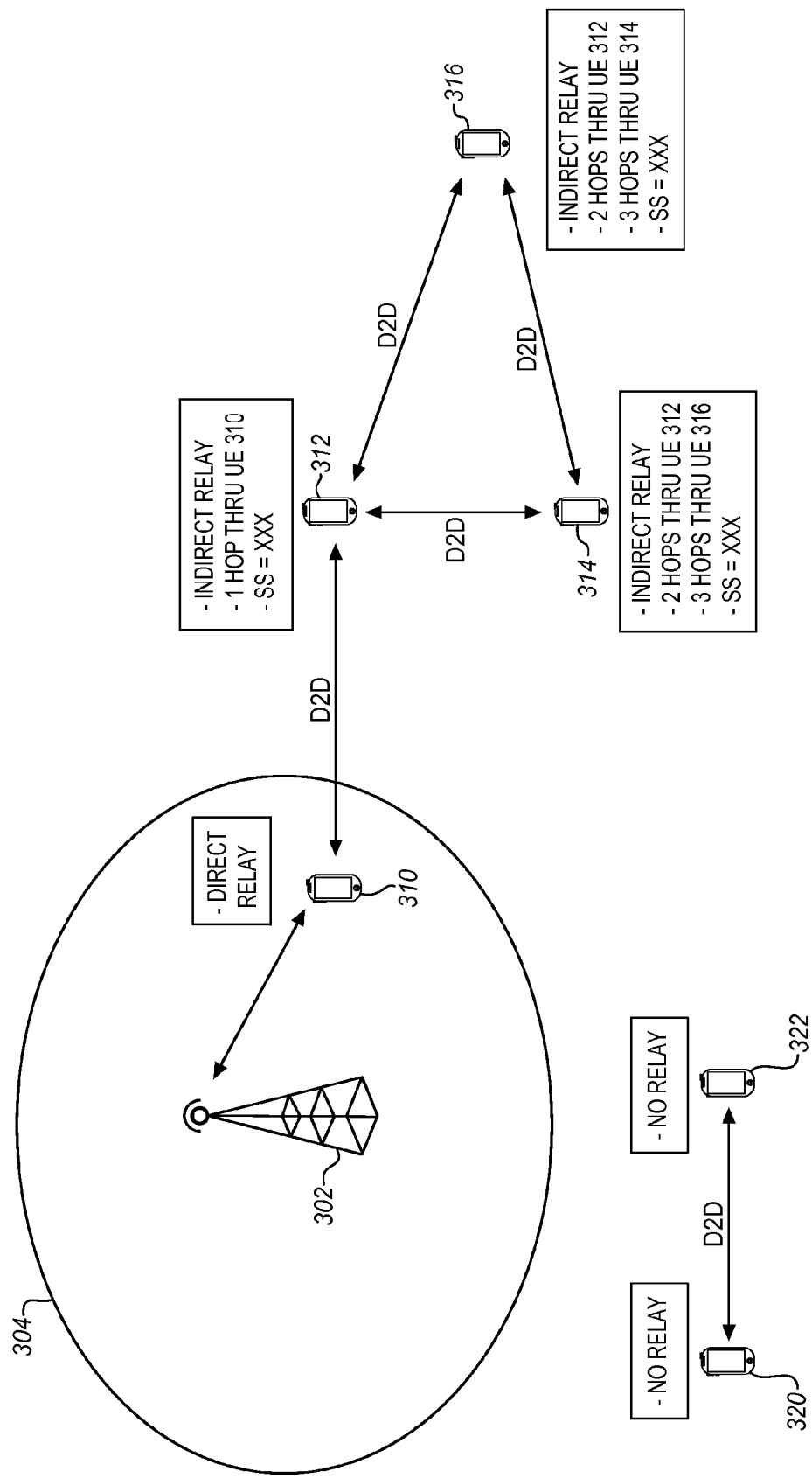
FIG. 6 illustrates the synchronization process for announcing relay capabilities in an exemplary embodiment.

FIG. 6 illustrates the synchronization process for announcing relay capabilities in an exemplary embodiment. During the synchronization process, when UE 310 is in the state of RRC_CONNECTED or RRC_IDLE, UE 310 determines that it is in-coverage of base station 302. UE 310 announces through the synchronization signals that it has direct relay capabilities.

UE 312 does not have communication with base station 302, so UE 312 determines that it is out-of-coverage of base station 302. However, UE 312 is proximate to UE 310 and is able to receive the synchronization signals from UE 310, so UE 312 determines that D2D communications are available with UE 310. Because of this, UE 312 determines that it has indirect relay capabilities. Also, because UE 312 has D2D communications with UE 310 that is in-coverage of base station 302 (i.e., has direct relay), UE 312 determines that there is one hop to the network (through UE 310). UE 312 also determines the signal strength (SS) with UE 310 (and other relay UEs). UE 312 then announces this information through the synchronization signals.

UE 314 does not have communication with base station 302, so UE 314 determines that is out-of-coverage of base station 302. However, UE 314 is proximate to UE 312 and is able to receive the synchronization signals from UE 312, so UE 314 determines that D2D communications are available with UE 312. Because of this, UE 314 determines that it has indirect relay capabilities. Also, UE 312 has announced that it has one hop to the network, so UE 314 determines that it has two hops to the network (through UE 312 and UE 310). UE 314 also determines the signal strength with UE 312 (and other relay UEs). UE 314 announces this information through the synchronization signals.

UE 316 does not have communication with base station 302, so UE 316 determines that is out-of-coverage of base station 302. However, UE 316 is proximate to UE 312 and is able to receive the synchronization signals from UE 312, so UE 316 determines that D2D communications are available with UE 312. Because of this, UE 316 determines that it has indirect relay capabilities. Also, UE 312 has announced that it has one hop to the network, so UE 316 determines that it has two hops to the network (through UE 312 and UE 310). UE 316 also determines that D2D communications are available with UE 314. UE 314 has announced that it has two hops to the network, so UE 316 determines that it has three hops to the network (through UE 314, UE 312, and UE 310). UE 316 also determines the signal strength with UE 312 and UE 314 (and other relay UEs). UE 316 announces this information through the synchronization signals.

UE 320 and UE 322 do not have communication with base station 302, so UEs 320 and 322 determine that they are out-of-coverage of base station 302. Also, UEs 320 and 322 are not able to receive synchronization signals from another UE that has direct or indirect relay capabilities. Therefore, UE 320 and UE 322 determine that they have no relay capabilities, and announce this information through the synchronization signals.

If a UE-to-network relay communication initiates, then a UE may determine how to route the communication traffic based on the relay capabilities of the UEs. To illustrate how communication traffic may be routed based on the relay capabilities, assume for example that UE 316 wants to transmit traffic to the network. Because UE 316 is not in-coverage of the network (i.e., not in coverage of base station 302), UE 316 will initiate a UE-to-network relay function to transmit the traffic. UE 316 is considered an "originating UE" in this instance.

Figure 7:
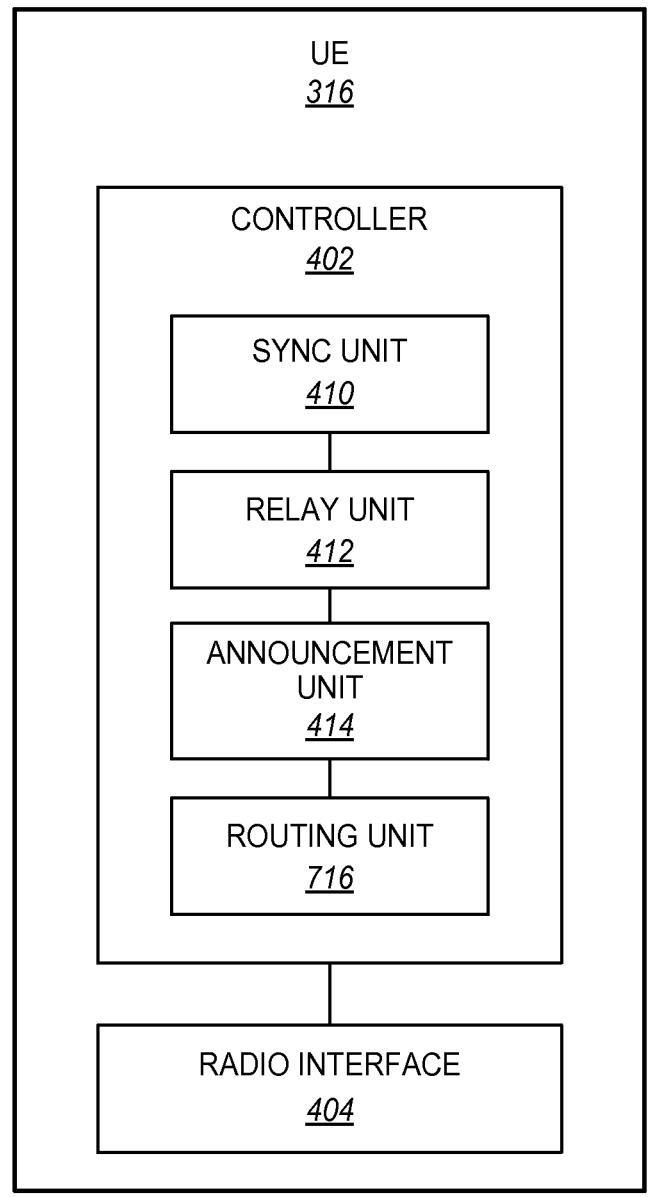
FIG. 7 illustrates a UE in an exemplary embodiment.

FIG. 7 illustrates UE 316 in an exemplary embodiment. UE 316 is enhanced in this embodiment to determine a route for traffic based on relay capabilities of relay UEs in its proximity. UE 316 includes a controller 402 (including a processor) and a radio interface 404 as described in FIG. 4. In this embodiment, controller 402 further provides a routing unit 716, which comprises an apparatus, a device, or equipment (including hardware) configured to determine a route for traffic based on relay capabilities of relay UEs.

Figure 8:
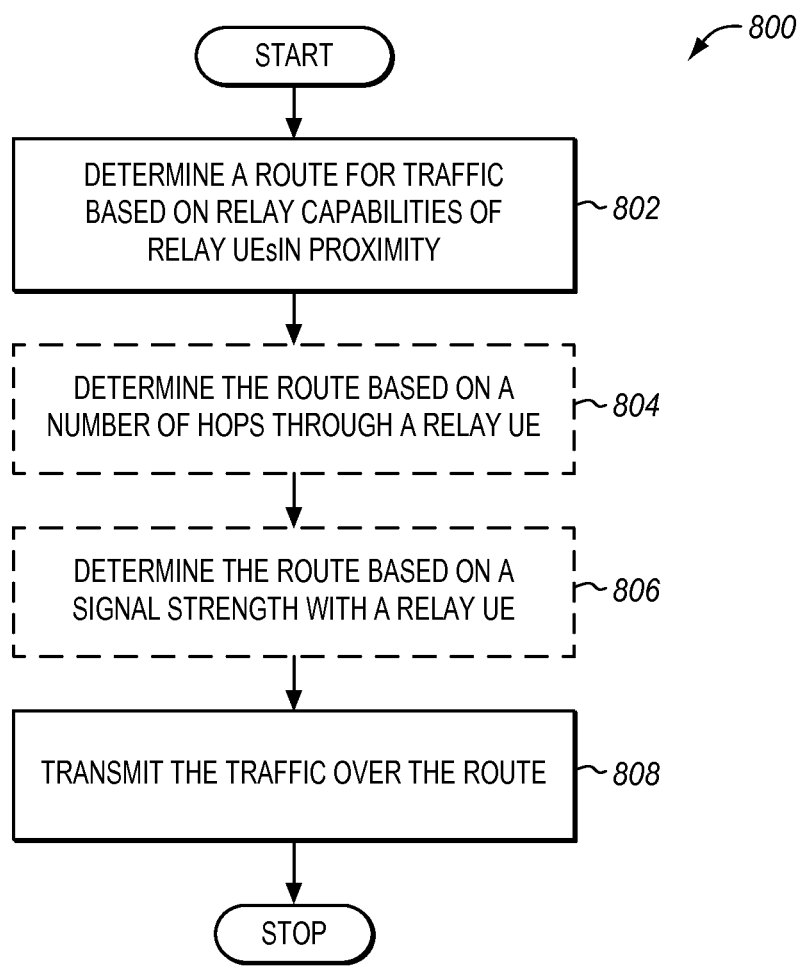
FIG. 8 is a flow chart illustrating a method of routing traffic for a UE-to-network relay in an exemplary embodiment.

FIG. 8 is a flow chart illustrating a method 800 of routing traffic for a UE-to-network relay in an exemplary embodiment. The steps of method 800 will be described with reference to UE 316 illustrated in FIG. 7, but those skilled in the art will appreciate that method 800 may be performed in any UE that is enabled for UE-to-network relay.

For method 800, it is assumed that UE 316 has performed the synchronization process above to announce its relay capabilities to the relay UEs in its proximity. It is also assumed that other UEs (e.g., UE 312 and UE 314) have announced their relay capabilities by exchanging synchronization signals with relay UEs. Therefore, UE 316 processes the synchronization signals to identify the relay capabilities of the relay UEs.

To transmit the traffic to the network, routing unit 716 (see FIG. 7) determines a route for the traffic based on the relay capabilities of the relay UEs in proximity (step 802). For example, if UE 316 is proximate to a relay UE has direct relay capabilities and a relay UE that has indirect relay capabilities, then routing unit 716 may determine the route for the traffic through the relay UE that has direct relay capabilities instead of the relay UE that has indirect relay capabilities.

Routing unit 716 may also determine the route based on the number of hops through a relay UE (optional step 804). For example, UE 316 in FIG. 6 has two relay UEs 312 and 314 in its proximity. The route through UE 312 has two hops and the route through UE 314 has three hops. Therefore, routing unit 716 may select the route with the least number of hops, which is through UE 312.

Routing unit 702 may also determine the route based on the signal strength with a relay UE (optional step 806). For example, UE 316 in FIG. 6 has two relay UEs 312 and 314 in its proximity. The signal strength between UE 314 and UE 316 may be stronger than the signal strength between UE 312 and UE 316. Therefore, routing unit 716 may select the route through the relay UE having the highest signal strength. Even though the route through UE 314 has a higher number of hops, routing unit 716 may select that route because of the higher signal strength.

Radio interface 404 then transmits the traffic over the route (step 808). For example, if routing unit 716 selects the route through UE 312, then radio interface 404 transmits the traffic to UE 312 for relay towards the network. UE 312 may perform a similar process as in FIG. 8 to route the traffic to UE 310. UE 310 has direct relay capabilities, so UE 310 will route the traffic to base station 302.

A similar process may occur if the network wants to send traffic to UE 316 (referred to as a "receiving UE"). In FIG. 6, one or more of UEs 310, 312, and 314 may act as a relay UE for the traffic. If the network sends the traffic to UE 310 through base station 302, then UE 310 identifies the traffic destined for UE 316. UE 310 then determines a route for the traffic based on relay capabilities of the relay UEs in proximity (step 802). For example, UE 310 may determine that it has direct communications with UE 312, which may act as a relay. Thus, UE 310 sends the traffic to UE 312. The same process may then occur in UE 312 when it receives the traffic from UE 310. UE 312 determines a route for the traffic based on relay capabilities of the relay UEs in proximity. For example, UE 312 may determine that it has direct communication with relay UE 314 and UE 316. Thus, UE 312 sends the traffic to UE 316.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
    relay User Equipment (UE) enabled for UE-to-network relay and configured to announce relay capabilities during a synchronization process, the relay UE comprising:
        a radio interface; and
        a controller configured to scan for a reference signal from a synchronization source during the synchronization process, and to synchronize timing of the radio interface to the reference signal;
        wherein the controller is further configured to generate, during the synchronization process, synchronization signals for synchronizing timing of the radio interface with other UEs in proximity for device-to-device (D2D) communication, to determine relay capabilities of the relay UE to act as a relay to re-transmit traffic between a remote UE and a network, and to insert an indication of the relay capabilities of the relay UE into the synchronization signals; and
        wherein the radio interface is configured to transmit the synchronization signals over-the-air to the other UEs.

2. The apparatus of claim 1 wherein:
    the controller is configured to insert the indication of the relay capabilities in a parameter of the synchronization signals, wherein the indication is selected from:
        direct relay where the relay UE is in-coverage of a base station;
        indirect relay where the relay UE is out-of-coverage of a base station but has D2D communication with another relay UE that is in-coverage of a base station; and
        no relay where the relay UE is out-of-coverage of a base station, and does not have D2D communication with another relay UE that is in-coverage of a base station.

3. The apparatus of claim 1 wherein:
    the controller is configured to determine a number of hops between the relay UE and the network over at least one of the other UEs, and to insert an indicator of the number of hops in the synchronization signals.

4. The apparatus of claim 1 wherein:
    the controller is configured to determine a signal strength between the relay UE and the other UEs in proximity, and to insert an indicator of the signal strength in the synchronization signals.

5. The apparatus of claim 1 wherein:
    the synchronization signals comprise D2D Synchronization Signals (D2DSS).

6. The apparatus of claim 1 wherein:
    the controller is configured to receive the synchronization signals from the other UEs, to process the synchronization signals to identify the relay capabilities of the other UEs, and to store the relay capabilities of the other UEs.

7. A method of operating relay User Equipment (UE) enabled for UE-to-network relay to announce relay capabilities of the relay UE during a synchronization process, the method comprising:
    scanning, by the relay UE, for a reference signal from a synchronization source;
    synchronizing timing of a radio interface in the relay UE to the reference signal;
    generating synchronization signals by the relay UE for synchronizing timing of the radio interface with other UEs in proximity for device-to-device (D2D) communication;
    determining relay capabilities of the relay UE to act as a relay to re-transmit traffic between a remote UE and a network;
    inserting an indication of the relay capabilities of the relay UE in the synchronization signals; and
    transmitting the synchronization signals from the radio interface of the relay UE over-the-air to the other UEs.

8. The method of claim 7 wherein inserting an indication of the relay capabilities of the relay UE in the synchronization signals comprises:
    inserting the indication of the relay capabilities in a parameter of the synchronization signals, wherein the indicator is selected from:
        direct relay where the relay UE is in-coverage of a base station;
        indirect relay where the relay UE is out-of-coverage of a base station but has D2D communication with another relay UE that is in-coverage of a base station; and
        no relay where the relay UE is out-of-coverage of a base station, and does not have D2D communication with another relay UE that is in-coverage of a base station.

9. The method of claim 7 further comprising:
    determining a number of hops between the relay UE and the network over at least one of the other UEs; and
    inserting an indicator of the number of hops in the synchronization signals.

10. The method of claim 7 further comprising:
    determining a signal strength between the relay UE and the other UEs in proximity; and
    inserting an indicator of the signal strength in the synchronization signals.

11. The method of claim 7 wherein:
    the synchronization signals comprise D2D Synchronization Signals (D2DSS).

12. The method of claim 7 further comprising:
    receiving the synchronization signals from the other UEs;
    processing the synchronization signals to identify the relay capabilities of the other UEs; and
    storing the relay capabilities of the other UEs.

13. An apparatus comprising:
    originating User Equipment (UE) enabled for UE-to-network relay, the originating UE comprising:
        a controller configured to receive synchronization signals from a plurality of relay UEs for synchronizing the originating UE with the relay UEs in preparation for device-to-device (D2D) communication, wherein the controller is further configured to employ the synchronization signals to synchronize timing of radio resources between the originating UE and the relay UEs for the D2D communication, and
        wherein the controller is further configured to process the synchronization signals to identify relay capabilities of the relay UEs to act as relays to re-transmit traffic between the originating UE and a network, and to determine a route for traffic toward the network based on the relay capabilities of the relay UEs in proximity; and
        a radio interface configured to transmit the traffic toward the network over the route.

14. The apparatus of claim 13 wherein:
the controller is configured to determine the route for the traffic based on a number of hops from each of the relay UEs to the network.

15. The apparatus of claim 13 wherein:
the controller is configured to determine the route for the traffic based on a signal strength between each of the relay UEs and the originating UE.

16. A method of operating originating User Equipment (UE) enabled for UE-to-network relay, the method comprising:
receiving synchronization signals in the originating UE from a plurality of relay UEs for synchronizing the originating UE with the relay UEs prior to device-to-device (D2D) communication, wherein the originating UE and the relay UEs are configured to use the synchronization signals to synchronize timing of radio resources between the originating UE and the relay UEs for the D2D communication;
processing the synchronization signals to identify relay capabilities of the relay UEs to act as relays to re-transmit traffic between the originating UE and a network;
determining a route for traffic toward the network based on the relay capabilities of the relay UEs in proximity; and
transmitting the traffic toward the network over the route.

17. The method of claim 16 wherein determining the route for the traffic comprises:
determining the route for the traffic based on a number of hops from each of the relay UEs to the network.

18. The method of claim 16 wherein determining the route for the traffic comprises:
determining the route for the traffic based on a signal strength between each of the relay UEs and the originating UE.

* * * * *